United States Patent [19]

Fowler et al.

[11] Patent Number: 5,999,795
[45] Date of Patent: Dec. 7, 1999

[54] RF GPS LONG CABLE DRIVER

[75] Inventors: Clarence W. Fowler, Elgin; Louis J. Vaccaro, Jr., Austin; David L. Hindman, Austin; Gerald D. Powell, Austin; David A. Fowler, Elgin; David L. Hirsch, Austin; Charles L. Ladwig, IV, Round Rock, all of Tex.

[73] Assignee: Starlink Inc., Austin, Tex.

[21] Appl. No.: 08/926,900

[22] Filed: Sep. 10, 1997

[51] Int. Cl.[6] ............................................... H04H 1/00
[52] U.S. Cl. ........................ 455/5.1; 455/314; 455/318; 455/22; 455/3.2
[58] Field of Search ................................. 453/314, 318, 453/571; 455/313, 315, 11.1, 523, 571, 12.1; 342/22, 352, 353, 419

[56] References Cited

U.S. PATENT DOCUMENTS

| | | | |
|---|---|---|---|
| 5,276,918 | 1/1994 | Cornforth et al. | 455/571 |
| 5,535,441 | 7/1996 | Jackson et al. | 455/182.2 |
| 5,600,364 | 2/1997 | Hendricks et al. | 348/1 |
| 5,682,195 | 10/1997 | Hendricks et al. | 348/6 |
| 5,748,049 | 5/1998 | Bayruns et al. | 331/49 |
| 5,784,683 | 7/1998 | Sistanizadeh et al. | 455/5.1 |
| 5,805,975 | 9/1998 | Green, Sr. et al. | 455/3.2 |
| 5,898,455 | 4/1999 | Barakat et al. | 348/6 |

*Primary Examiner*—Dwayne D. Bost
*Assistant Examiner*—Charles R Craver
*Attorney, Agent, or Firm*—Patrick Stellitano; Fulbright & Jaworski LLP

[57] ABSTRACT

An apparatus for extending the practical lengths over which coaxial cables can be used to transfer signal information from a Global Positioning System (GPS) antenna to a GPS receiver. The apparatus converts the GPS signal frequency of 1.57542 GHz to a frequency low enough to be transferred long distances over coaxial cables without significant signal attenuation and then converts the signal back to the original frequency without the introduction of frequency errors. The invention is not restricted from being used at other frequencies where system design parameters makes it practical.

7 Claims, 4 Drawing Sheets

RF GPS LONG CABLE DRIVER

TECHNICAL FIELD

The present invention relates to a long cable synchronous signal transmission system.

BACKGROUND OF THE INVENTION

There are applications for Global Positioning System (GPS) receivers that require the receiver to be placed a thousand feet or more from the antenna. The largest of these applications at the present time is the use of GPS timing receivers for time synchronization and frequency control in telephone networks. This application of GPS timing receivers may require the antenna to be placed atop a large office building and routing a coaxial cable through the building to the telephone network control room where the GPS receiver is located. The losses in standard low cost coaxial cable will be between 10 dB and 30 dB per 100 feet at 1.57542 GHz. It is well known that losses in coaxial cable increase with frequency. For example, RG58C coaxial cable is listed in Buchsbaum's Handbook of Practical Electronics as having 1.6 dB of loss per 100 feet at 10 MHz and 24 dB per 100 feet at 1 GHz. Coaxial cable losses have been dealt with in the past in one of two ways. The first approach involves the placement of a Low Noise Amplifier (LNA) at the antenna with enough gain to overcome the cable losses. However at GPS frequencies, this approach is useful only for cable lengths up to about 200 feet. The second approach utilizes Low Noise Block (LNB) down conversion to a lower frequency at the antenna and transferring the signal at a lower frequency over a coaxial cable to a receiver designed to accept the lower frequency. This approach is not suitable for GPS receivers which are designed to receive the 1.57542 GHz signal. Nor is it a cost-effective solution to redesign the GPS receiver to accept a lower frequency signal. Thus, a need exists for a method and apparatus for transmitting a signal received at a high frequency down a long length of cable with relatively low loss to be received by a receiver designed to accept a high frequency signal.

SUMMARY OF THE INVENTION

The present invention seeks to deal with coaxial cable losses in a third way by using a down-converter section at the antenna and an up-converter section at the receiver to convert the signal back to the original frequency received at the antenna. To prevent the introduction of frequency errors, a reference signal is transmitted along the cable and is used in both the up-conversion and down-conversion processes. In summary, a received signal at a frequency too high to be transmitted along a length of cable without appreciable loss in amplitude is down-converted to a lower frequency. The down-conversion process comprises mixing the received signal with a local oscillator signal to produce an intermediate frequency. The intermediate frequency is transmitted down the length of cable. The intermediate frequency is selected to be much lower than the frequency of the received signal. Since signal attenuation along the cable decreases as frequency decreases, the lower frequency intermediate signal will experience lower loss than would the higher frequency received signal. At the opposite end of the cable, the intermediate signal is up-converted to a higher frequency output signal. The up-conversion process is accomplished by mixing the intermediate signal with a local oscillator signal. The local oscillator signals in both the up-converter and down-converter are derived from the same reference signal. For GPS applications, a GPS signal at a frequency of 1.57542 GHz is received by an antenna and enters a converter where it is subtracted from 1.6368 GHz to yield a 61.38 MHz intermediate frequency. The intermediate frequency is amplified and enters a diplexer. The diplexer is an arrangement of a two-way power-splitter and filters that isolate the 61.38 MHz intermediate frequency and the 16.368 MHz reference frequency, thus allowing the coaxial cable to transfer both signals simultaneously. The intermediate frequency arrives at the diplexer on the receiving end of the coaxial cable and is directed to a converter where it is mixed with the 1.6368 GHz local oscillator (LO) signal to reproduce the signal at 1.57542 GHz. The output of the converter is then filtered and attenuated to a signal level that is representative of a signal received by an active GPS antenna with a gain of 30 dB. The GPS receiver connected to the output of the up-converter sees the signal as if it were connected to a standard active GPS antenna. Other frequencies can be used for the local oscillator signals and reference signal to produce any desired intermediate signal frequency, and still achieve the objects of the present invention. The need for this invention stems from the fact that hundreds of thousands of GPS receivers are being manufactured to receive 1.57542 GHz because the overwhelming use for GPS is in positioning and navigation applications, which do not require long coaxial cables. The high volume production of these receivers has driven the price below the cost at which special purpose receivers capable of driving long coaxial cables can be produced. This invention will enable the use of the lower cost GPS receivers in applications requiring cables longer than 100 feet. Timing and frequency control applications are examples of this requirement. However, the principles of the invention may be applied to any received signal to be transmitted over cable for reception by a device designed to receive a signal higher in frequency than what can be efficiently transmitted over a long length of cable.

These and other features, aspects, and advantages of the present invention will become better understood with reference to the following description, appended claims and drawings.

DETAILED DESCRIPTION OF PREFERRED EMBODIMENTS

Figure 1:
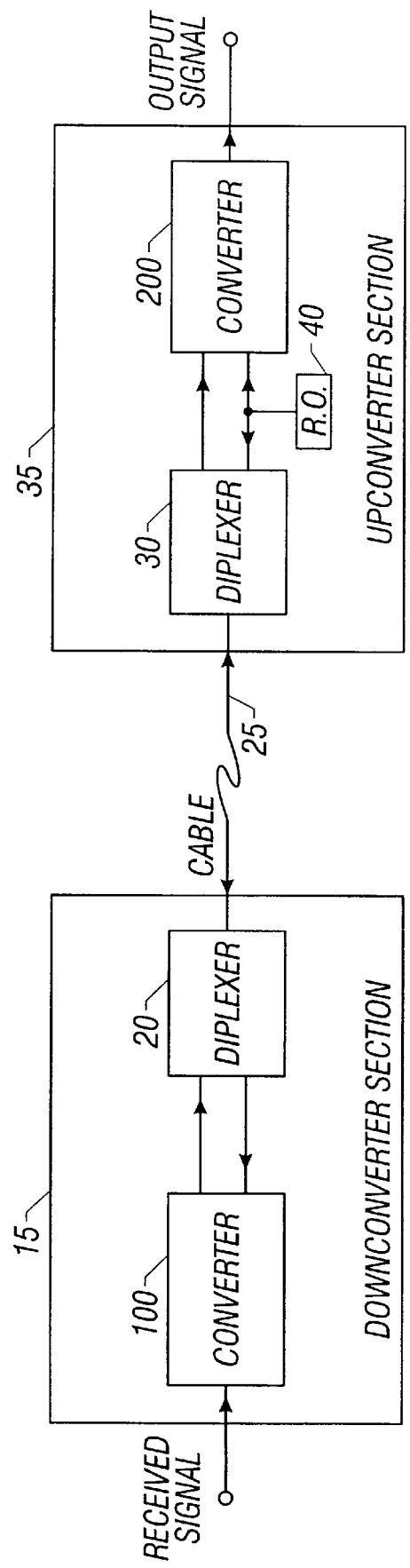
FIG. 1 is a block diagram of an embodiment of the present invention.

A block diagram of a preferred embodiment of the present invention is shown in FIG. 1 as a down-converter section 15 and an up-converter section 35 connected by a length of cable 25. A reference oscillator 40 generates a reference signal which is conducted to cable 25 by a diplexer 30. Another diplexer 20 receives the reference signal from cable 25 and conducts it to a converter 100. Converter 100 generates a local oscillator (LO) signal from the reference signal and mixes the LO signal with the received signal at a high frequency to produce an intermediate signal at a lower frequency. The intermediate signal is conducted by diplexer 20 to cable 25. The intermediate signal is received from cable 25 by diplexer 30. Diplexer 30 conducts the intermediate signal to another converter 200. Converter 200 generates a LO signal from the reference signal received from reference oscillator 40 and mixes the LO signal with the intermediate signal to produce an output signal at a frequency equal to the frequency of the signal received by converter 100. The frequency of the reference signal from reference oscillator 40 is chosen to be sufficiently low to be transmitted on cable 25 with low loss. Similarly, the LO signal generated by converter 100 is such as to produce an intermediate signal at a frequency sufficiently low to be transmitted on cable 25 with low loss.

Figure 2:
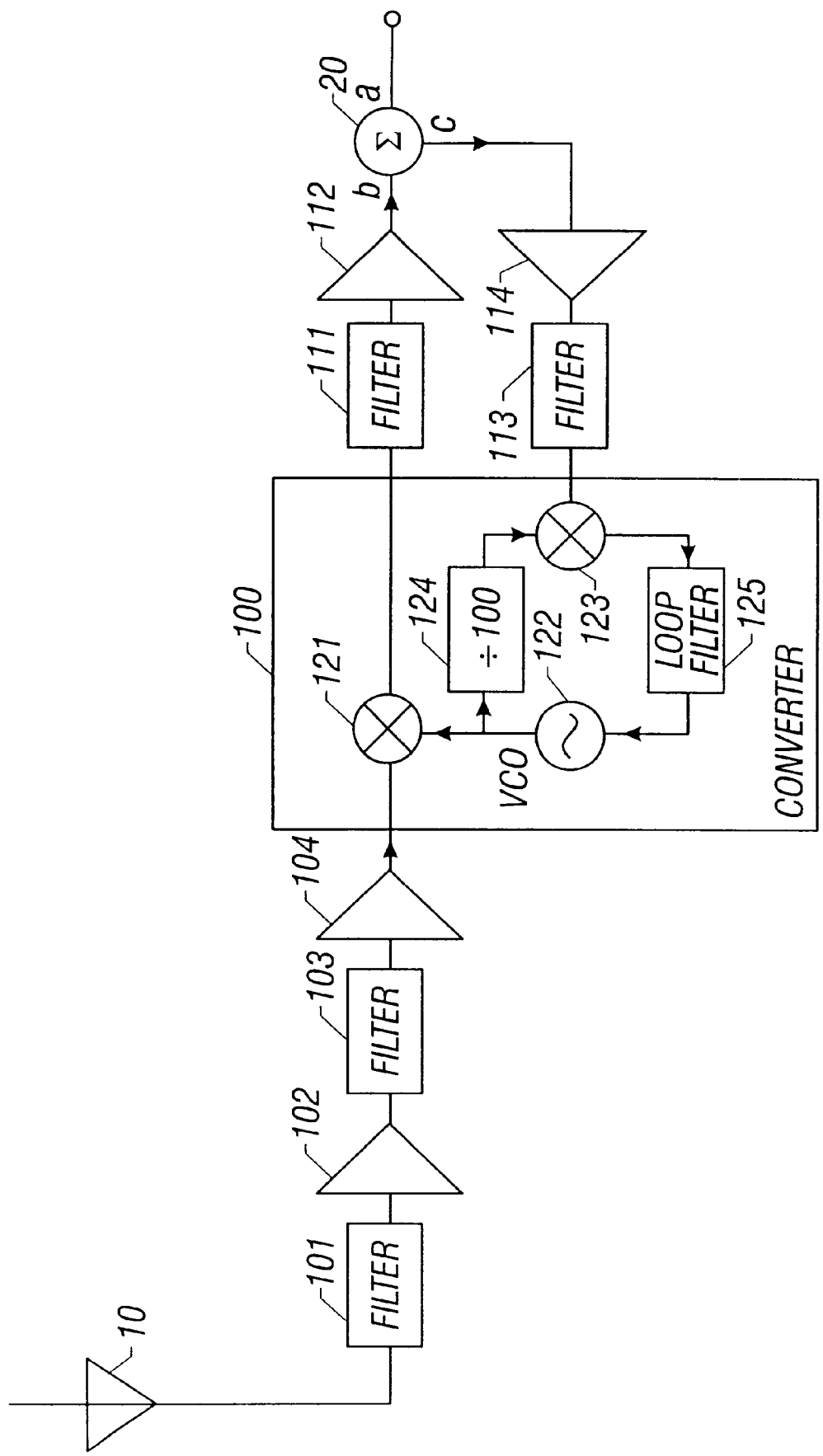
FIG. 2 is a diagram of a preferred embodiment of a down-converter section.

A detailed diagram of a preferred embodiment of down-converter section 15 is shown in FIG. 2 in conjunction with an antenna 10 for receiving a GPS signal at 1.57542 GHz. The signal from antenna 10 will typically be filtered and amplified before being input to converter 100. The first filter 101, reduces the probability of overloading the preamplifier 102 with out-of-band signals such as cellular radio emissions. A suitable device for implementing the functions of filter 101 is a Murata DFC21R57. The output of filter 101 is input to preamplifier 102 which is desirably a low noise amplifier such as a Motorola MMRF1501. The output of amplifier 102 is then filtered by a filter 103 to further avoid interference. The signal then enters a second low noise amplifier 104 to further increase the gain before frequency conversion and thus reduce noise in the conversion process. The total gain before conversion is approximately 30 dB. The signal then enters converter 100 where sum and difference frequencies are generated. Means for implementing converter 100 are well known in the art. In particular, converter 100 may be implemented using an NEC UPB1004GS. The reference signal frequency is chosen to be 16.368 MHz. A LO signal at a frequency of 1.6368 GHz is generated in converter 100 by a voltage controlled oscillator (VCO) 122. VCO 122 effectively multiplies the 16.368 MHz reference signal frequency from reference oscillator 40 by a factor of 100 using a standard technique of dividing the LO frequency by 100 and then comparing this frequency with the reference frequency of 16.368 MHz in a phase detector. This is a well known method for generating frequencies that are exact multiples of a reference frequency. A functional diagram of converter 100 is shown in FIG. 2. The reference signal is received from cable 25 by diplexer 20. The signal is amplified by an amplifier 114 and is filtered by a filter 113. The output of VCO 122 is divided by a factor of 100 in a frequency divider 124 and mixed with the reference signal in mixer 123. The output of a mixer 123 is filtered by a loop filter 125 and input to VCO 122. Thus, a phase locked loop is implemented to drive the output of VCO 122 to a frequency of 1.6368 GHz. The LO signal output by VCO 122 is mixed with the received signal in a mixer 121 to produce an intermediate signal at a frequency of 61.38 MHz. The intermediate signal is selected by passing the output of mixer 121 through a filter 111 which is tuned to 61.38 MHz. This signal is then amplified by an amplifier 112 so that the overall gain is 90 dB in down-converter section 15. The intermediate signal from amplifier 112 then enters diplexer 20, which is a two-way power splitter. For ease of reference, the ports of diplexer 20 are labelled a, b and c. The diplexer employed in a preferred embodiment comprises Mini-Circuits LRPS 2-1. This device provides 30 dB of isolation between ports b and c, but only 3 dB of attenuation between ports a and b and between ports a and c. Alternatively, diplexer 20 could be implemented by using passive inductive and capacitive elements. Filter 113 provides additional isolation of the reference signal.

Figure 3:
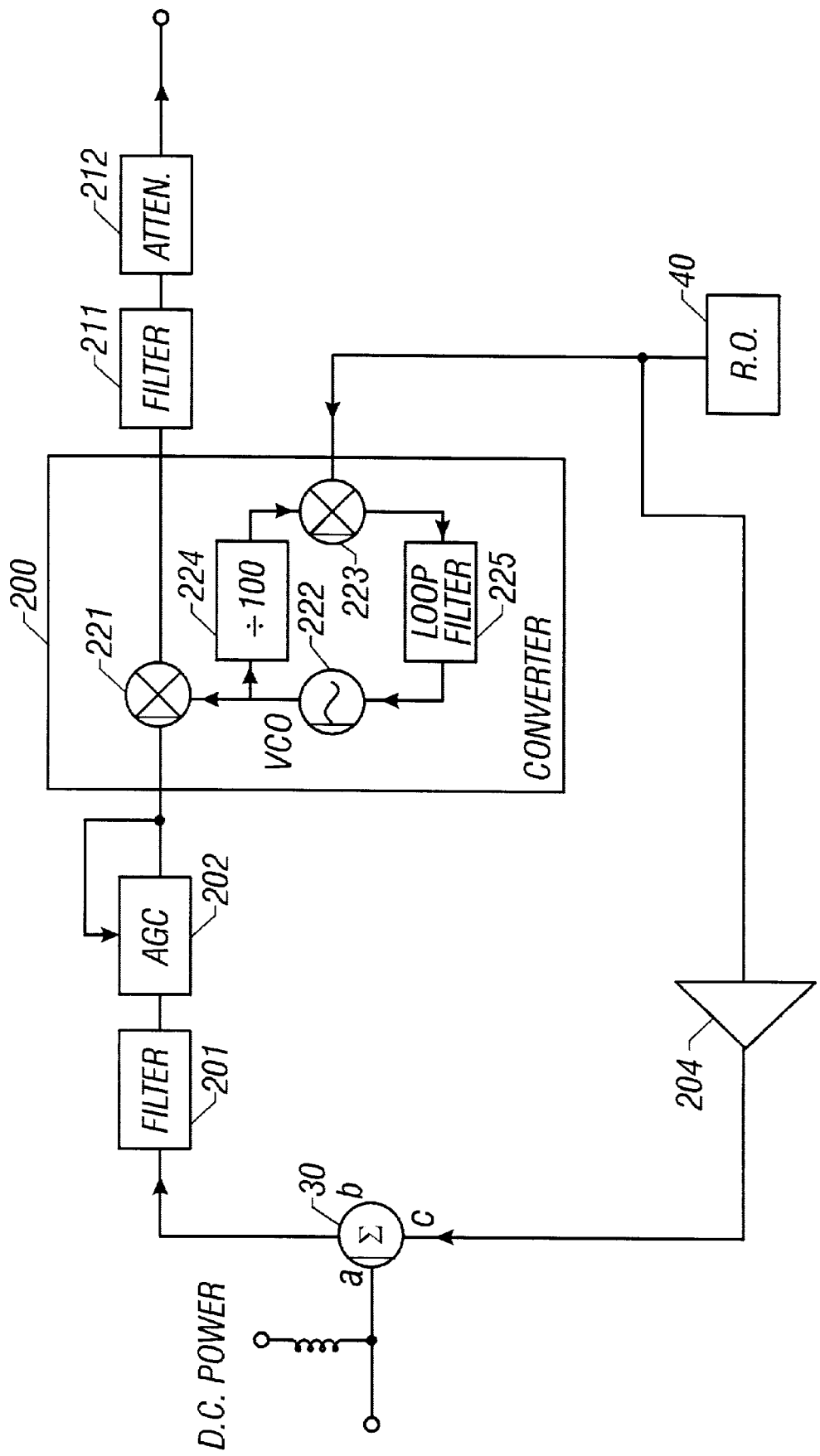
FIG. 3 is diagram of a preferred embodiment of an up-converter section.
Figure 4:
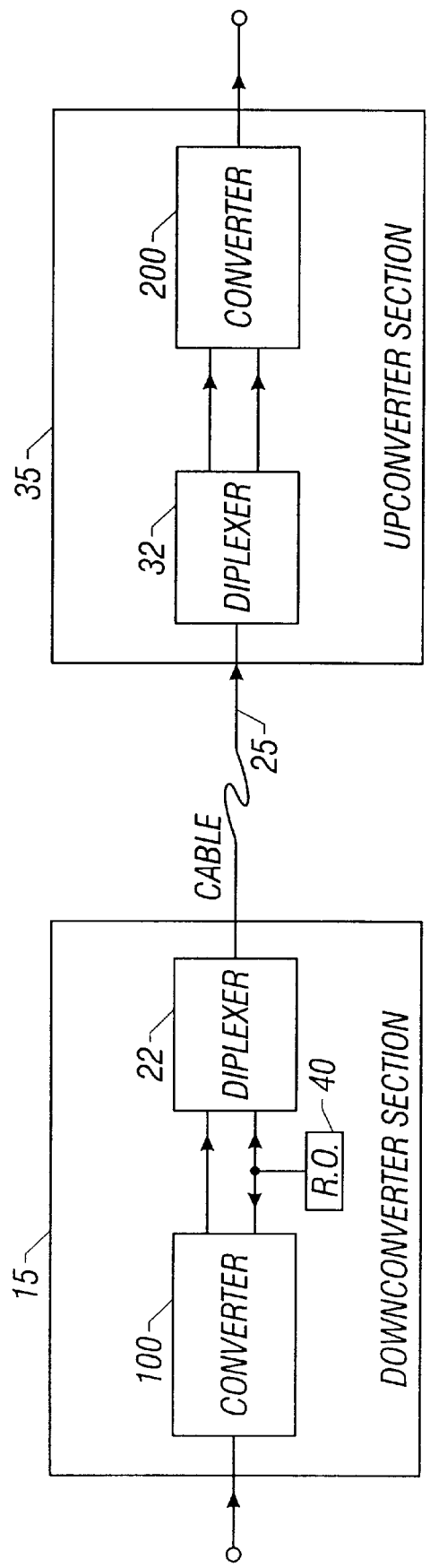
FIG. 4 is a block diagram of an alternative embodiment of the invention.

FIG. 3 is a diagram of up-converter section 35. The intermediate signal from port a of diplexer 20 travels along cable 25 and is received by port a of diplexer 30. The operation of diplexer 30 is similar to the operation of diplexer 20, and, in fact, may be implemented using identical components. The reference signal from reference oscillator 40 is amplified by a buffer amplifier 204 and conducted from port c to port a of diplexer 30 to cable 25. The intermediate signal is conducted from port a to port b of diplexer 30 to a filter 201. Filter 201 provides additional isolation of the intermediate signal. The intermediate signal then enters an Automatic Gain Controlled (AGC) amplifier 202 where the losses in the coaxial cable at 61.38 MHz are normalized so that overall gain from the antenna to the output of AGC amplifier 202 is 80 dB independent of the cable length. The AGC function is necessary to allow any cable length to be used without gain adjustment at installation because 1000 feet of standard coaxial cable such as RG58 will have up to 40 dB of loss at 61.38 MHz where as 100 feet would have only 4 dB of loss. Means for implementation of automatic gain control are well known in the art. Preferably, AGC amplifier 202 comprises an RF Micro Devices RF 2604. After leaving AGC amplifier 202, the signal enters converter 200. The operation and implementation of converter 200 is similar to that of converter 100. The local oscillator signal output by the VCO 222 is 1.6368 GHz, which is 100 times the frequency of the reference signal received by converter 200 from reference oscillator 40. Thus, the output of the mixer 221 is a signal of frequency equal to 1.57542 GHz. After leaving the converter, the signal is filtered by a filter 211 to select the 1.57542 GHz product of the converter. The signal is then attenuated by an attenuator 212 to a level representative of the signal from an active GPS antenna which is what the low cost GPS receiver expects an input signal. Note that DC power to down-converter section 15 is, as a matter of practical convenience, conducted to down-converter section 15 by cable 25. A separate power source or separate cable could be provided for this purpose. In a preferred embodiment, reference oscillator 40 is located in up-converter section 35, which is typically located in a controlled environment. In an alternative embodiment, reference oscillator 40 could be placed in down-converter section 15. This embodiment is shown in FIG. 4. Diplexers 22 and 32 are similar in characteristics to diplexers 20 and 30 described above. The essential difference is that the direction of the reference signal through the diplexers and cable is reversed. The implementation of this alternative embodiment would be apparent to one of ordinary skill in the art given the disclosure herein.

Further, a person of ordinary skill in the art would readily recognize that other values for the local oscillator frequencies and reference frequency described herein could be selected to achieve the objectives of the present invention.

Clearly, changes can be made in the above-described details without departing from the underlying principles of the present invention. A description of a particular embodiment does not determine the scope of an invention. Rather, the scope of the present invention is determined by the following claims.

What is claimed is:

1. A long-cable synchronous signal transmission system, comprising:
   a reference oscillator for generating a reference signal;
   a first converter for mixing a received signal with a first local oscillator signal generated from said reference signal to produce an intermediate signal;
   a cable with a first end and a second end;
   a first diplexer for conducting said intermediate signal to said first end of said cable and for receiving said reference signal from said first end of said cable;

a second diplexer for conducting said reference signal to said second end of said cable and for receiving said intermediate signal from said second end of said cable; and a second converter for mixing said intermediate signal with a second local oscillator signal generated from said reference signal to produce an output signal wherein the reference signal and intermediate signal derived therefrom are of frequencies chosen to be operably detectable after transmission through the cable without amplification between the ends of said cable.

2. The system of claim 1, further comprising an automatic gain controller to provide an intermediate signal level that is independent of the length of the cable.

3. The system of claim 1, further comprising an attenuator for attenuating the output signal.

4. A long-cable synchronous signal transmission system, comprising:

a reference oscillator for generating a reference signal;

a first converter for mixing a received signal with first local oscillator signal generated from said reference signal to produce an intermediate signal;

a cable with a first end and a second end;

a first diplexer for conducting said intermediate signal to said first end of said cable and for conducting said reference signal to said first end of said cable;

a second diplexer for receiving said reference signal from said second end of said cable and for receiving said intermediate signal from said second end of said cable; and a second converter for mixing said intermediate signal with a second local oscillator signal generated from said reference signal to produce an output signal wherein the reference signal and intermediate signal derived therefrom are of frequencies chosen to be operably detectable after transmission through the cable without amplification between the ends of said cable.

5. A method for transmitting a received signal along a long length of cable comprising the steps of:

generating a reference signal;

transmitting said reference signal along the cable;

generating a first local oscillator signal from said reference signal;

mixing said first local oscillator signal with the received signal to produce an intermediate signal;

transmitting said intermediate signal along the cable;

generating a second local oscillator signal from said reference signal;

mixing said second local oscillator signal with said intermediate signal to produce an output signal wherein the reference signal and intermediate signal derived therefrom are of frequencies chosen to be operably detectable after transmission through the cable without amplification between the ends of said cable.

6. The method of claim 5, further comprising the step of automatically controlling the gain of the intermediate signal to provide an intermediate signal level that is independent of the length of the cable.

7. The method of claim 5, further comprising the step of attenuating the output signal.

* * * * *